United States Patent

[11] 3,523,520

[72] Inventor Earl E. Evans
Pine Bluff, Ark.
1511 Chester St., Little Rock, Arkansas 72202

[21] Appl. No. 686,497
[22] Filed Nov. 29, 1967
[45] Patented Aug. 11, 1970

[54] METHOD OF FEEDING FISH
4 Claims, 7 Drawing Figs.

[52] U.S. Cl. .......... 119/51, 119/3; 222/178/193
[51] Int. Cl. .......... A01k 5/00
[50] Field of Search .......... 222/1, 178, 193; 119/3, 56A, 51; 222/193 up, 178 up; 119/56A up, 51 up, 3 up, 56A up; 222/193, 178 up

[56] References Cited

UNITED STATES PATENTS

| | | | |
|---|---|---|---|
| 1,282,697 | 10/1918 | Johnson | 222/193X |
| 1,444,648 | 2/1923 | Willis et al | 222/193 |
| 1,482,495 | 2/1924 | Westhaver | 222/193 |
| 2,764,321 | 9/1956 | Gerdes et al | 222/242 |
| 2,975,543 | 3/1961 | Funk | 222/193X |

*Primary Examiner*— Robert B. Reeves
*Assistant Examiner* — Hadd S. Lane
*Attorneys*—Clarence A. O'Brien and Harvey B. Jacobson

ABSTRACT: A method for feeding fish, especially channel catfish, employing a hopper mounted upon a farm tractor and containing a mechanism powered by the power take-off of the tractor for effectuating the transfer of pelletized fish feed from the hopper to the discharge pipe of a centrifugal blower so that the air will entrain the feed without causing breakage of the pellets and discharge the feed in a preselected direction over a relatively large surface area of a pond in spaced relation to its banks.

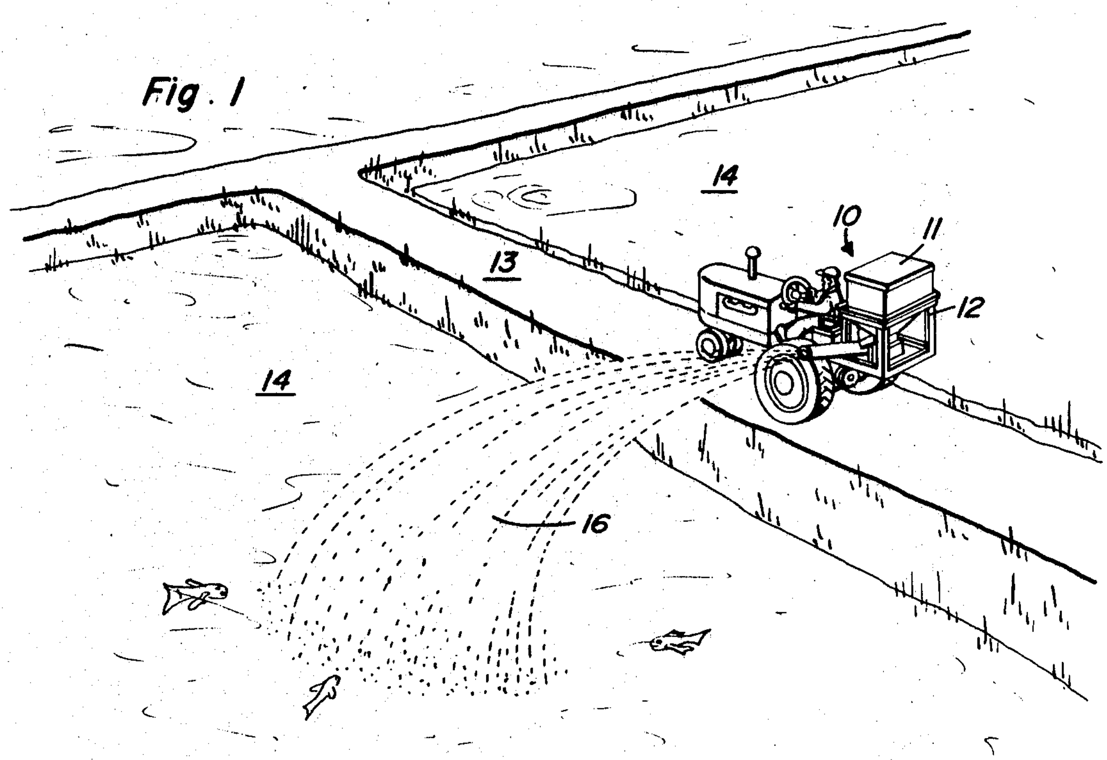
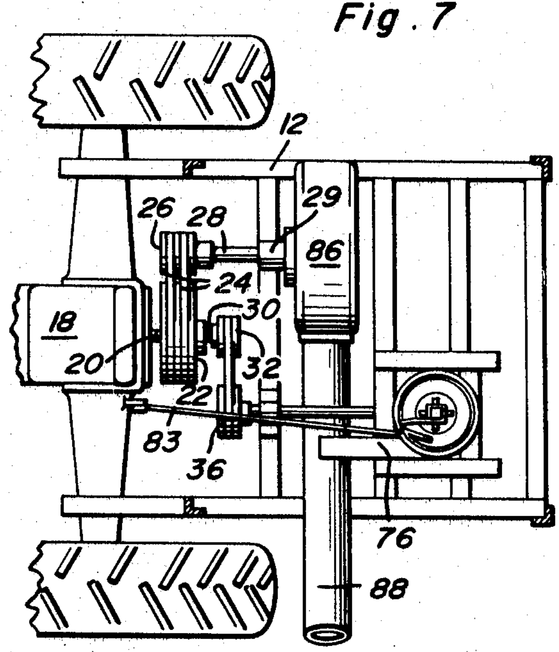
Earl E. Evans
INVENTOR.
BY Clarence A. O'Brien
and Harvey B. Jacobson
Attorneys

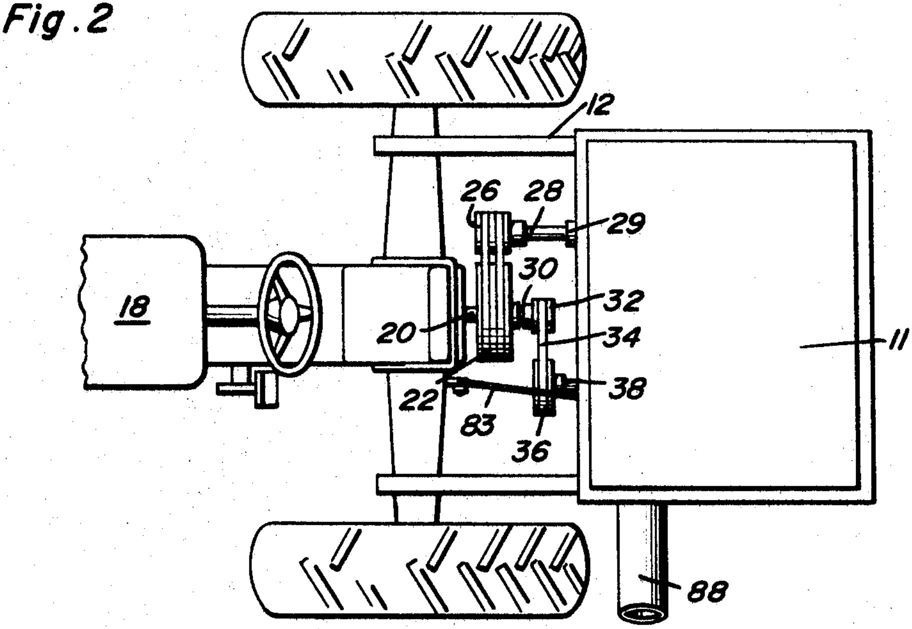
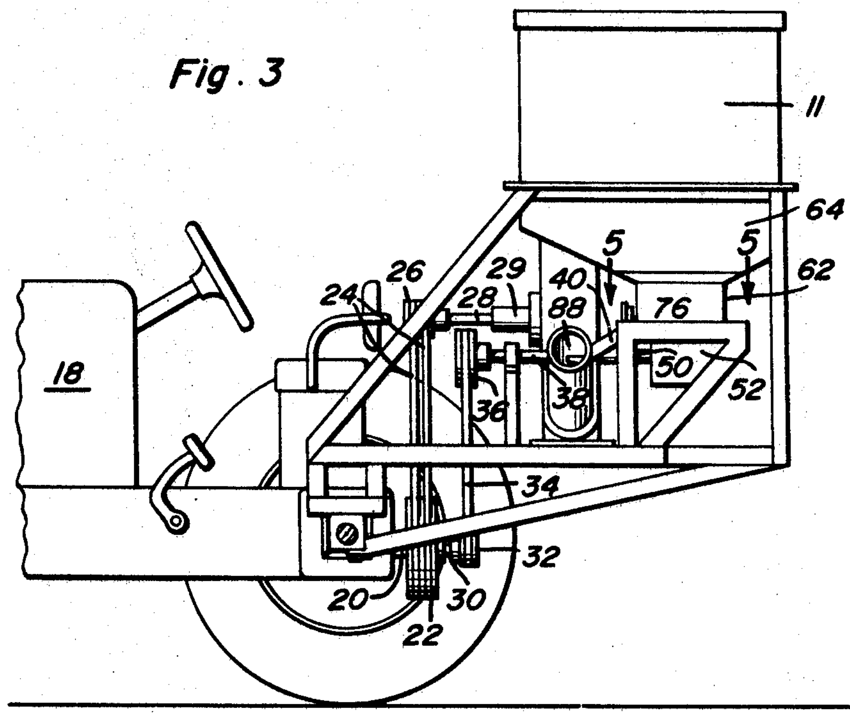
Earl E. Evans
INVENTOR.
BY Clarence A. O'Brien and Harvey B. Jacobson
Attorneys Patented Aug. 11, 1970 3,523,520
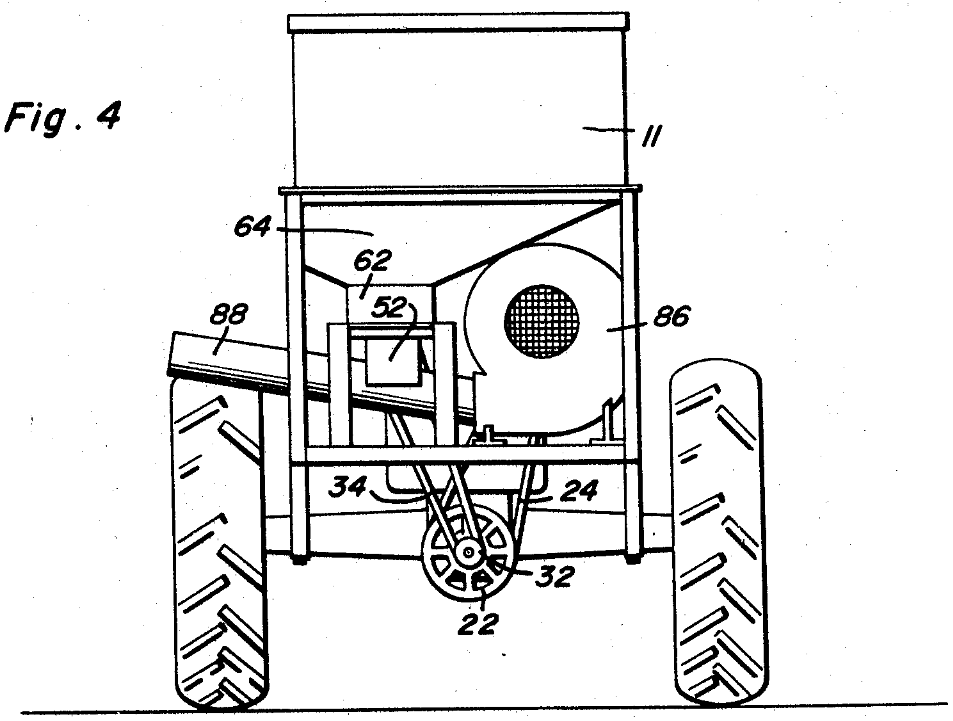
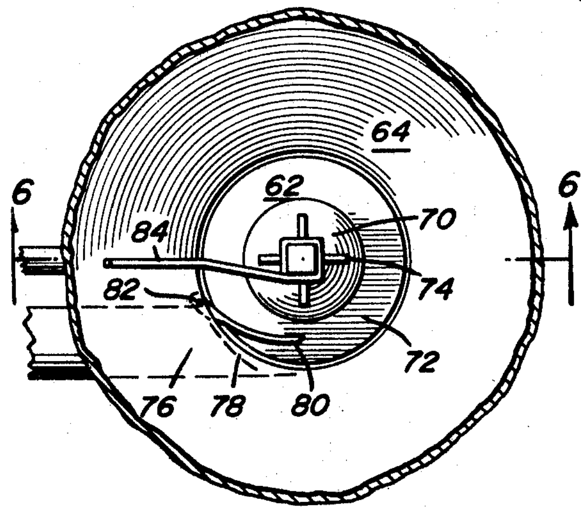
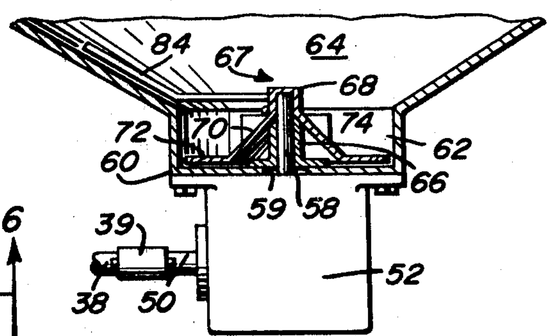
Earl E. Evans
INVENTOR.
BY Clarence A. O'Brien and Harvey B. Jacobson
Attorneys

METHOD OF FEEDING FISH

The field of the present invention relates to a method and associated apparatus for feeding fish. More specifically, the invention is directed to a feeding device which may be used in blowing a stream of fish feed into man made fish ponds.

With the fish farming industry on the increase, new methods are being tried by those involved in order to raise production of fish in a minimum period of time and at least cost. A fish farm is characterized by man made fish ponds which are dug in long rows and in side-by-side relation with adjacent pond rows. Roadways are constructed between adjacent rows thereby enabling individuals to walk along the roads with buckets filled with fish feed during which time the feed is manually dispensed into the ponds at periodic feeding intervals. This manual dispensation involves serious problems for the fish farmer in the way of reduced production and high waste. These problems are encountered due to the fact that one dispensing feed manually is limited in his capacity to project feed into the interior area of the pond well away from the banks. An actual result of manual dispensation results in a great amount of feed being deposited upon or close to the banks whereupon it is either unavailable to the fish or accessible only to the larger fish who by virtue of their natural superiority prevent their smaller sized brothers from sharing the feed. The prior art includes mechanical attempts to increase the speed at which the feeding process may be completed. A typical mechanization includes a hopper stationarily mounted adjacent a pond and including an auger which conveys the feed from the hopper to a fixed predetermined point in the pond. The disadvantage experienced by utilization of this prior construction resides in the fact that the outward projection of feed depends upon the length of auger, pipe and the inclination of same with respect to a pond surface. It will be appreciated that a large length of pipe becomes difficult to handle and store and the feed will merely drop straight down into the pond in the immediate vicinity of the pipe end.

In summary, the present invention includes a hopper and associated mechanism mounted upon a tractor which utilizes the power take-off of the tractor to dispense feed contained in the hopper to a centrifugal blower outlet pipe section. As a portion of the feed moves into the pipe section, it becomes subjected to acceleration due to entrainment in the air and upon exit from the pipe, the feed is directed outwardly. In operation, the tractor is driven along a roadway adjoining adjacent rows of fish ponds. The pipe is directed outwardly toward the center of each pond and as the tractor passes the pond, the feed is blown a distance far removed from the banks of the pond. As a result, the feed is distributed evenly within the pond thus affording all fish in the pond an opportunity to share the feed. Accordingly, among the salient objects of the present invention are to provide a method and apparatus:

To mechanically dispense fish feed to ponds;

To decrease the period of time necessary to dispense fish feed into the rows of ponds on a fish farm;

To substantially eliminate waste of fish feed by depositing same away from the banks of a pond;

To provide a uniform dispensation of feed within a fish pond; and

To provide a mechanical fish feed distributor which may be used in conjunction with conventional tractors.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a view in perspective illustrating the present invention mounted upon a tractor proceeding with a fish feeding operation.

FIGURE 2 is a top plan view of the present invention as mounted upon the rear end housing of a farm tractor.

FIGURE 3 is a side elevational view illustrating the utilization of a tractor power take-off.

FIGURE 4 is a rear elevational view illustrating a portion of the power transmission train of the instant invention.

FIGURE 5 is a fragmentary sectional view upon a plane passing along section line 5--5 in FIGURE 3.

FIGURE 6 is a fragmentary vertical sectional view upon a plane passing along section line 6--6 of FIGURE 5.

FIGURE 7 is a top plan view of the instant apparatus after removal of the hopper.

Referring specifically to the drawings, a preferred embodiment of the present invention is illustrated in use in FIGURE 1 of the drawings wherein reference numeral 10 generally refers to the fish feeding device mounted upon a farm tractor of conventional design and including a hopper 11 mounted to the rear of the tractor by support frame 12. As shown in FIGURE 1, the tractor is driven along a roadway 13 or top surface of the bank which separates adjacent rows of fish ponds 14. The fish feed is projected outwardly over the bank of the pond 14 into a central area of the pond, as denoted by reference numeral 16, where the feed is made available to all fish contained therein thus avoiding feed being wasted by landing on the bank or in shallow water adjacent thereto.

The present invention employs the power take-off shaft 20 of a conventional tractor generally referred to by reference numeral 18. A double groove V-belt pulley 22 is concentrically mounted upon the power take-off shaft 20 and V-belts 24 are entrained about the pulley 22 in a parallel manner. The belts 24 are likewise entrained about a vertically disposed and coplanar pulley 26. The pulley 26 is concentrically mounted on a shaft 28 which is oriented in a horizontal manner and disposed to project rearwardly from the rear of the tractor 18. The rearward end of shaft 28 is fixedly attached to a coupling 29, the latter being associated with the drive of a centrifugal blower as explained hereinafter.

The power take-off shaft 20 is extended to a shaft portion 30 disposed on the rearward side of the pulley 22. The free end of this shaft portion 30 is concentrically affixed to a pulley 32 which drives a second pulley 36 disposed vertically above pulley 32 and aligned therewith by a V-belt 34 entrained about both pulleys 32 and 36. The pulley 36 is coaxially mounted on a horizontal shaft 38 which extends directly rearwardly therefrom. The rearward end portion of this shaft is keyed through a coupling 39 to the input shaft 50 of a conventional worm gear type speed reducer 52 shown diagrammatically in FIGURE 6, the reducer being capable of speed reduction from 450 r.p.m. to a range between 50 and 75 r.p.m. The reducer casing is fastened by suitable fasteners to a bottom wall 60 of a lower cylindrical hopper portion 62, the latter appending from a conical hopper portion 64. A vertically extending reducer output shaft 58 passes through a circular aperture 59 formed within the bottom wall 60 of the lower cylindrical hopper portion 62. An intermediate length of the output shaft 58 is supported by a cylindrical bearing 66 which prevents lateral play of the shaft in its upper portion and rotates within the lower portion 62 of the hopper. The lower surface of the bearing 66 is affixed to the interior surface of the bottom hopper wall 60. The top portion of shaft 66 is characterized by a square cross-sectional profile. This squared end portion is constructed to mate with a frusto-conical socket which is positioned over and lowered onto the shaft 66 so that the socket becomes keyed to the shaft. From an inspection of FIGURE 6, it may be seen that the socket generally referred to by reference numeral 67 is characterized by a hollow square cap 68 which is keyed to the top square portion of shaft 66. The cap is integrally connected with a hollow conical portion 70 diverging downwardly toward and integrally connected with a disk-like washer 72 with a central aperture formed therein. It is noted that the central portion of socket 67 is hollow thus permitting shaft 56 and cylindrical bearing 66 to reside therein. The socket is further characterized by triangular vanes 74 affixed to the conical portion 70 whereby the hypotenuse of each triangular vane is suitably affixed to the outer conical surface.

Referring to FIGURE 5 of the drawings, a pipe section or conduit 76 contains an inlet 78 of concave dimension which communicates with the lower cylindrical hopper portion 62 at a discharge port formed therein, the hopper portion 62 is integrally formed with hollow conical hopper base 64. In operation, the vanes 74 rotate in a manner pushing feed into the vicinity of the pipe inlet 78. A contour butterfly valve 80 conforming to the aperture 78 is positioned within said aperture for the express purpose of controlling the amount of feed which enters the aperture 78. The butterfly valve 80 is pivotally hinged by a suitable pin 82 for allowing the valve to swing horizontally. The valve may be spring loaded to retain the valve in a normally closed position. In addition a suitable stop may be provided to limit the outward opening of valve 80. One end of a lanyard, cable, or other suitable device 83 is attached to the valve for controlling the displacement of the valve from the aperture 78. The opposite end of the lanyard 83 terminates on the tractor in a vicinity convenient to the driver of the tractor so that he may control the effective aperture opening of pipe section 76.

FIGURES 5 and 6 of the drawings illustrate a rotating agitating rod 84 one end of which conforms to the interior conical inclination of the hopper wall 64. The intermediate length of the rod is oriented horizontally and the interior end of the rod is wrapped around the square top cap 68 of the socket 67 thereby keying the rod to the socket and providing positive rotation thereto in accordance with the rotation of the socket. The purpose of this rod is to agitate the feed in the adjoining area thereby preventing the feed from packing which would result in a loss of flow through the hopper.

Referring to FIGURES 3 and 7, pipe section 76 is inclined downwardly and connected to a second pipe section or blower tube 88 of larger diameter. This second larger pipe section 88 is connected to the outlet pipe of a centrifugal fan 86. Thus, as a velocity of blown air passing through the larger pipe 88 is established, air in the smaller pipe section 76 will be frictionally engaged by the air moving through the larger pipe section 88 and a static pressure is developed within the smaller pipe section 76 which is less than atmospheric pressure in accordance with the energy flow equation. As a result, the feed located within the bottom of the hopper is drawn by a suction effect through the smaller pipe section 76 into the larger pipe section 88 whereupon it is blown outwardly from the larger pipe section in a direction dictated by the pipe orientation. In actual operation, the larger pipe section is disposed perpendicularly to the side of a tractor and inclined upwardly therefrom so that the direction of feed flow is outwardly and upwardly from the tractor side into a central area or at least a substantial distance from the edge of a fish pond as the tractor progresses forwardly along a roadway, as clearly shown in FIGURE 1 of the drawings.

It is appreciated that the speed of the power take-off from the tractor is adjustable thereby enabling the pulley system discussed hereinbefore to rotate at a preselected speed. Accordingly, speed governing of the vaned socket is possible which results in an adjustable density of feed available at the blower pipe outlet. Further, the variable power take-off rotation allows an adjustment to be made in the speed of the centrifugal blower thus permitting an adjustably variable distance of feed projection over a pond.

It is further appreciated that the instant invention is by no means limited to distribution of fish feed. In view of the foregoing, it should be obvious that distribution of substantially all coarse granular materials is amenable to the present method and apparatus.

Further, if a large capacity hopper is required, the present invention can be supported on a conventional wheeled frame and drawn by a tractor.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

I claim:

1. A method of feeding fish from a pellet distributor, said distributor including a hopper for said pellets, a blower, and a distributing chute, said method comprising steps of positioning the distributor adjacent a body of water containing said fish, passing a stream of pellets from said hopper to said chute, directing the chute toward said body of water, blowing said pellets from said chute and onto the surface of said body of water whereby said pellets are available to said fish.

2. The method set forth in Claim 1 together with the steps of mounting the distributor to a vehicle and driving the vehicle to the edge of the water body.

3. The method of Claim 1 further including the step of passing the pellets from said hopper to a metering device to assure delivery of a uniform stream of pellets to said chute.

4. The method set forth in Claim 1 together with the step of directing the chute upwardly to project the pellets a substantial distance from the edge of the water body.